United States Patent
Lim et al.

(10) Patent No.: US 11,641,018 B2
(45) Date of Patent: May 2, 2023

(54) UNIT CELL OF FUEL CELL AND METHOD OF MANUFACTURING THE SAME

(71) Applicants: HYUNDAI MOTOR COMPANY, Seoul (KR); KIA MOTORS CORPORATION, Seoul (KR)

(72) Inventors: Soo Jin Lim, Seongnam-Si (KR); Byeong-Heon Jeong, Yongin-Si (KR); Seong Il Heo, Yongin-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 83 days.

(21) Appl. No.: 17/169,798

(22) Filed: Feb. 8, 2021

(65) Prior Publication Data
US 2021/0167403 A1   Jun. 3, 2021

Related U.S. Application Data

(63) Continuation-in-part of application No. 16/197,191, filed on Nov. 20, 2018, now abandoned.

(30) Foreign Application Priority Data

Jun. 22, 2018   (KR) .................. 10-2018-0072124

(51) Int. Cl.
  *H01M 8/0273*   (2016.01)
  *H01M 4/88*   (2006.01)
  *H01M 8/1004*   (2016.01)

(52) U.S. Cl.
  CPC ....... *H01M 8/0273* (2013.01); *H01M 4/8807* (2013.01); *H01M 8/1004* (2013.01)

(58) Field of Classification Search
  None
  See application file for complete search history.

(56) References Cited

U.S. PATENT DOCUMENTS

| | | | | |
|---|---|---|---|---|
| 2009/0286121 | A1* | 11/2009 | Morimoto | H01M 8/1004 429/494 |
| 2013/0011766 | A1* | 1/2013 | Lundblad | H01M 8/242 429/492 |

FOREIGN PATENT DOCUMENTS

| | | |
|---|---|---|
| EP | 1923943 A1 | 5/2008 |
| JP | 2002-160257 A | 6/2002 |
| JP | 2003-282090 A | 10/2003 |
| JP | 5062389 B2 | 10/2012 |
| JP | 2014-216226 A | 11/2014 |
| JP | 2017-112083 A | 6/2017 |
| KR | 10-1620155 B1 | 5/2016 |

(Continued)

OTHER PUBLICATIONS

Final Office Action dated Sep. 9, 2020 issued in U.S. Appl. No. 16/197,191.

(Continued)

*Primary Examiner* — Daniel S Gatewood
(74) *Attorney, Agent, or Firm* — Morgan, Lewis & Bockius LLP (57) ABSTRACT

A unit cell of a fuel cell includes: an insert including a membrane electrode assembly and a gas diffusion layer; a foamed body disposed on an outer side surface of the insert; and a frame covering an outer side surface of the foamed body such that a polymer resin is injected to the outer side surface of the foamed body while the polymer resin partly penetrates into the foamed body.

8 Claims, 8 Drawing Sheets

(56) References Cited

FOREIGN PATENT DOCUMENTS

KR     10-2017-0072392 A     6/2017
KR     10-2019-0047822 A     5/2019

OTHER PUBLICATIONS

Non-Final Office Action dated May 19, 2020 issued in U.S. Appl. No. 16/197,191.
Japanese Office Action dated Feb. 22, 2022, issued in corresponding Japanese Patent Application No. 2018-218605.

* cited by examiner

FIG. 1

-PRIOR ART-

-PRIOR ART-

UNIT CELL OF FUEL CELL AND METHOD OF MANUFACTURING THE SAME

CROSS REFERENCE TO RELATED APPLICATION

The present application is a Continuation-In-Part patent application of U.S. patent application Ser. No. 16/197,191, filed on Nov. 20, 2018, which claims priority to Korean Patent Application No. 10-2018-0072124, filed Jun. 22, 2018, the entire contents of which is incorporated herein for all purposes by this reference.

TECHNICAL FIELD

The present disclosure relates to a unit cell of a fuel cell and a method of manufacturing the same. More particularly, the present disclosure relates to a technique including a foamed body for molding a frame to assemble a membrane electrode assembly and a gas diffusion layer as one body.

BACKGROUND

A fuel cell refers to a generator that converts chemical energy of a fuel into electrochemical energy. Fuel cells are used not only to supply driving power for industrial purposes, household purposes, and vehicles, but also to power small electronic products such as portable devices. Recently, the range of use for fuel cells has been gradually expanded to a highly efficient and clean energy source.

Among the fuel cells, a polymer electrolyte membrane fuel cell (PEMFC) among various kinds of fuel cells is capable of operating at relatively low temperatures and having characteristics such as fast starting and response. Thus, PEMFCs are mainly used for supplying driving power for vehicles.

A required number of unit cells is stacked to configure a stack of a PEMFC, each of the unit cells including: a membrane electrode assembly (MEA) including an anode, a cathode, and a polymer electrolyte membrane which is interposed between the anode and the cathode, a gas diffusion layer (GDL), a separator made of a metal and called a bipolar plate, and a gasket.

The MEA is configured such that an electrolyte membrane is attached with electrodes. An ion conductive polymer is mainly used as an electrolyte membrane, and required to have high ion conductivity, and to have a high mechanical strength in a humid condition, low gas permeability, and high thermal and chemical stability.

In addition, the GDL is a member diffusing hydrogen gas and air introduced from a channel of a separator more widely and thinly to supply hydrogen and air to an MEA, supporting a catalyst layer, moving electrons generated from the catalyst layer to the separator, and serving as a passage through which generated water is discharged to the outside of the catalyst layer, and each GDL is provided on upper and lower surfaces of the MEA respectively.

In recent years, a unit cell of a fuel cell has been developed in which a frame is integrally formed on outer side surfaces of an MEA and a GDL by using a polymer resin in an injection molding manner in order to improve the ease of manufacturing the fuel cell stack.

Figure 1:
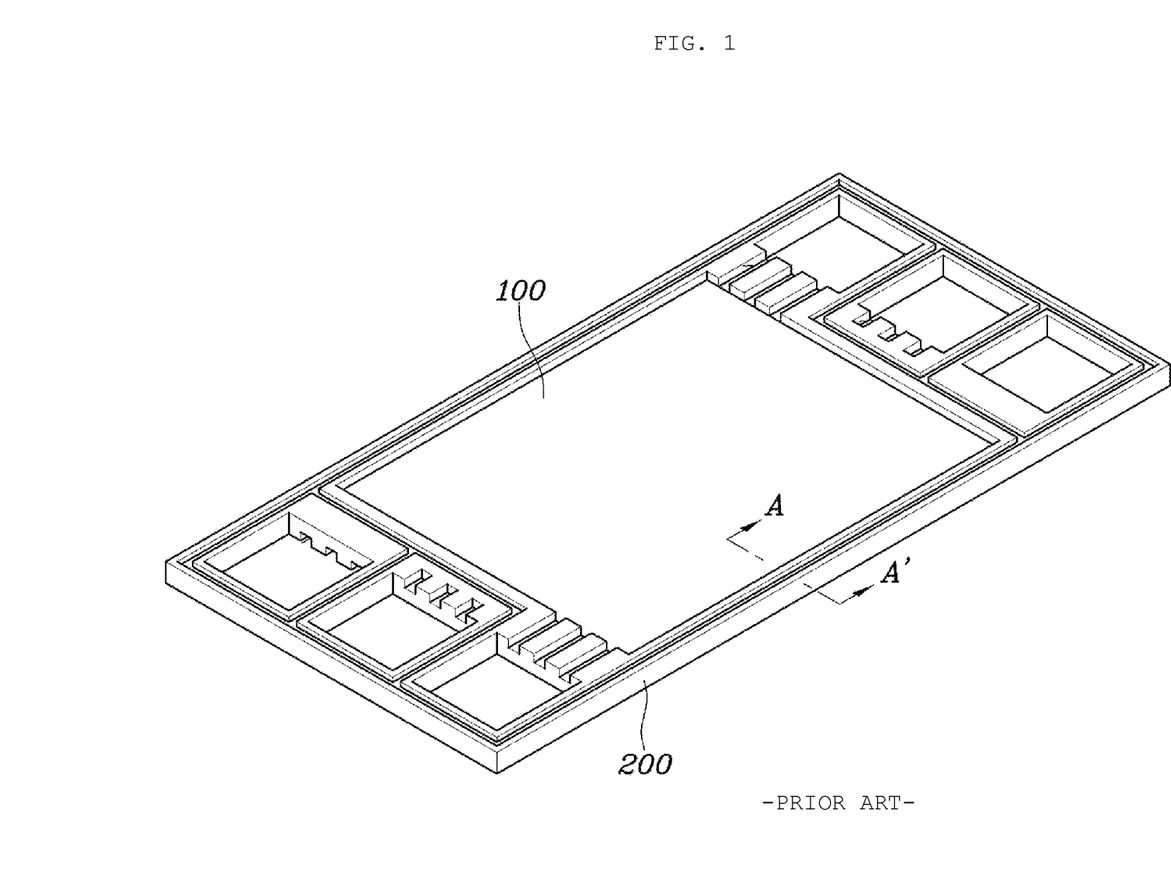
FIG. 1 is a perspective view illustrating a unit cell of a fuel cell according to the related art.
Figure 2:
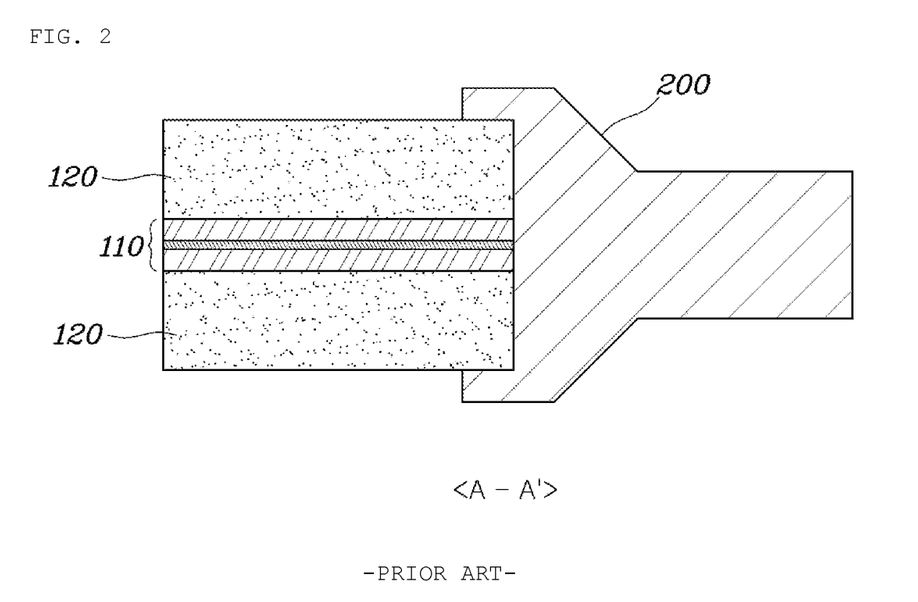
FIG. 2 is a cross-sectional view illustrating a unit cell of a fuel cell according to the related art.

FIG. 1 is a perspective view illustrating a unit cell of a fuel cell according to the related art, and FIG. 2 is a cross-sectional view illustrating a unit cell of a fuel cell according to the related art.

Referring to FIGS. 1 and 2, the unit cell of the fuel cell according to the related art is configured with a frame 200 covering an MEA 110 and an outer periphery surface thereof. In detail, each GDL 120 is configured to be respectively provided at upper and lower surfaces of the MEA, and the outer periphery surface of the MEA is configured to be covered by the frame.

However, since the frame is formed by using the polymer resin in an injection molding manner, the polymer resin irregularly penetrates into the MEA and the GDL due to the injection pressure which is a force to inject the polymer resin such that the MEA and the gas diffusion layer are damaged.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose a unit cell of a fuel cell and a method of manufacturing the same, the method being configured to drop an injection pressure and to distribute the polymer resin uniformly when performing injection molding on outer side surfaces of a membrane electrode assembly (MEA) and a gas diffusion layer (GDL) with a polymer resin, thereby preventing damages of the MEA and the gas diffusion layer.

In order to achieve the above object, a unit cell of a fuel cell according to an exemplary embodiment of the present disclosure includes: an insert including a membrane electrode assembly (MEA) and a gas diffusion layer (GDL); a foamed body disposed on an outer side surface of the insert and having porosity; and a frame covering an outer side surface of the foamed body such that a polymer resin is injected to the outer side surface of the foamed body while the polymer resin partly penetrates into the porosity of the foamed body. The foamed body may be configured in which a top end of an inner side surface of the foamed body is higher than a top end of the outer side surface of the insert and a bottom end of the inner side surface of the foamed body is lower than a bottom end of the outer side surface of the insert such that the foamed body has a thickness greater than the insert.

The inner side surface of the foamed body may be configured to partly cover upper and lower surfaces of the insert.

The foamed body may be made of an electrically insulating material.

The foamed body may have a porosity greater than the MEA and the GDL.

The foamed body may be provided on the outer side surface of the insert in an extruding or injecting molding manner.

The foamed body may be configured on the outer side surface of the insert in an extruding or injecting molding manner.

The foamed body may include a first layer directly coming into contact with the outer side surface of the insert and a second layer coupled to cover an outer side surface of the first layer, and a porosity of the first layer may be small than a porosity of the second layer.

A part of or all of the foamed body may be melted with the polymer resin forming the frame such that the foamed body and the frame are assembled as one body.

An inner side surface of the frame may be configured to partly cover upper and lower surfaces of the insert.

In order to achieve the above object, a method of manufacturing a unit cell of a fuel cell according to another exemplary embodiment of the present disclosure includes: forming a foamed body on an outer side surface of an insert which includes a membrane electrode assembly and a gas diffusion layer; and forming a frame in which a polymer resin is injected to an outer side surface of the foamed body such that the polymer resin partly penetrates into the foamed body.

In the forming of the foamed body, the foamed body may be formed on the outer side surface of the insert in an extruding or injecting molding manner.

In the forming of the foamed body, a synthetic fiber may partly surround an outer portion of the insert.

In the forming of the frame, as the polymer resin penetrates into the foamed body, the frame may be assembled with the foamed body as one body such that an inner side surface of the frame partly covers upper and lower surfaces of the insert.

According to a unit cell of a fuel cell and a method of manufacturing the same of the present disclosure, it is possible to minimize damages of a membrane electrode assembly (MEA) and a gas diffusion layer (GDL) by a foamed body provided on an outer side surface of the MEA and the GDL.

In addition, it is possible to position the MEA and the GDL inside a mold.

Furthermore, it is possible to reduce an injection pressure introduced into the MEA and the GDL and distribute an injection material uniformly, thereby improving quality of products.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Specific structural and functional descriptions of embodiments of the present disclosure disclosed herein are only for illustrative purposes of the embodiments of the present disclosure. The present disclosure may be embodied in many different forms without departing from the spirit and significant characteristics of the present disclosure. Therefore, the embodiments of the present disclosure are disclosed only for illustrative purposes and should not be construed as limiting the present disclosure.

Reference will now be made in detail to various embodiments of the present disclosure, specific examples of which are illustrated in the accompanying drawings and described below, since the embodiments of the present disclosure can be variously modified in many different forms. While the present disclosure will be described in conjunction with exemplary embodiments thereof, it is to be understood that the present description is not intended to limit the present disclosure to those exemplary embodiments. On the contrary, the present disclosure is intended to cover not only the exemplary embodiments, but also various alternatives, modifications, equivalents and other embodiments that may be included within the spirit and scope of the present disclosure as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, exemplary embodiments of the present disclosure will be described in detail with reference to the accompanying drawings. Throughout the drawings, the same reference numerals will refer to the same or like parts.

Figure 3A:
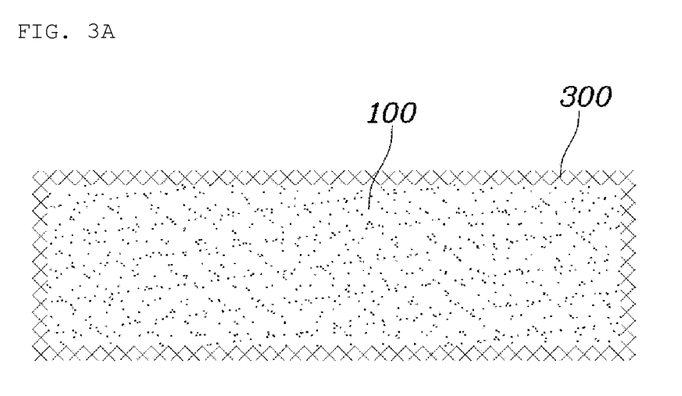
FIGS. 3A and 3B depict top views each illustrating a unit cell of a fuel cell according to an embodiment of the present disclosure.
Figure 3B:
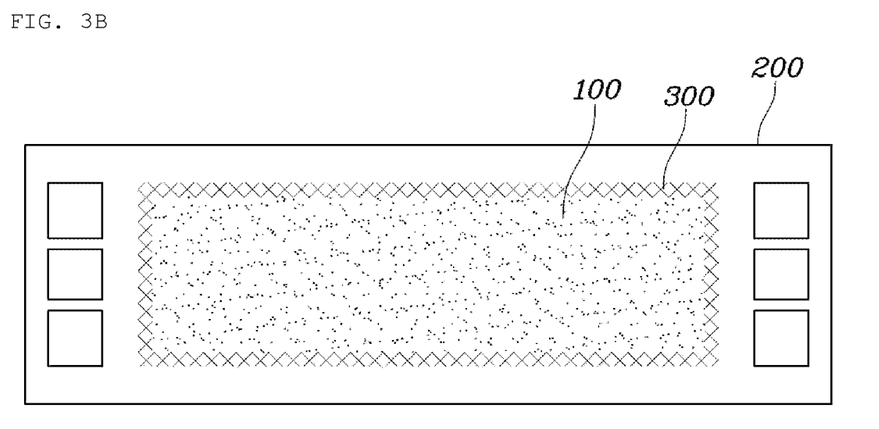
Figure 4:
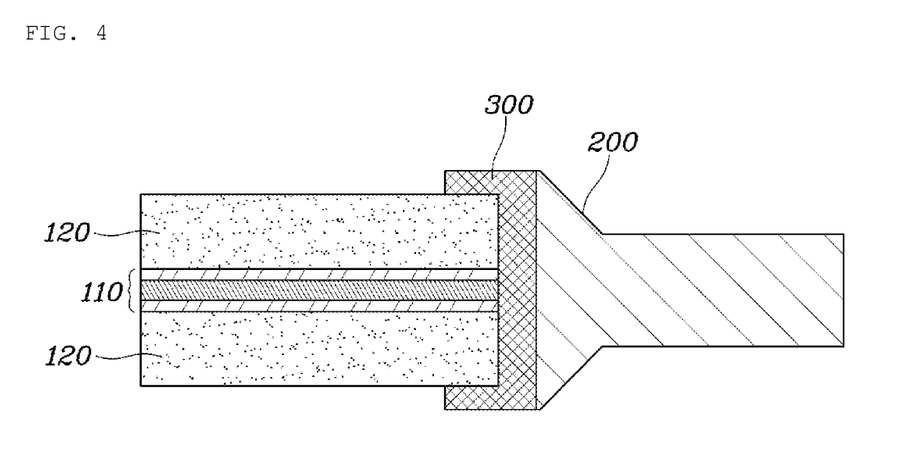
FIG. 4 is a cross-sectional view illustrating the unit cell of the fuel cell according to the embodiment of the present disclosure.
Figure 5:
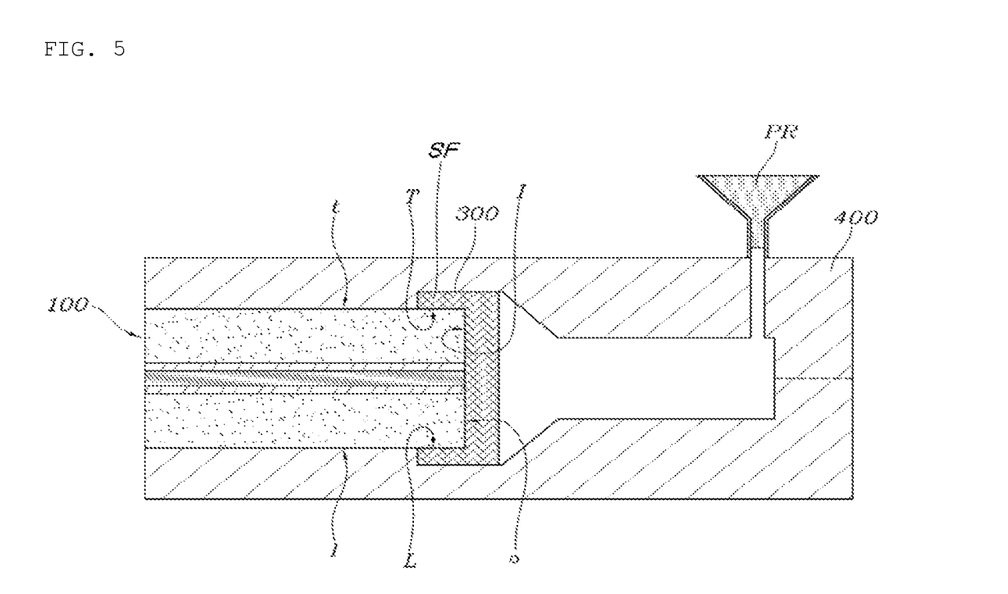
FIG. 5 is a diagram illustrating a frame and a mold of the unit cell of the fuel cell according to the embodiment of the present disclosure.

FIGS. 3A and 3B depict top views each illustrating a unit cell of a fuel cell according to an embodiment of the present disclosure; FIG. 4 is a cross-sectional view illustrating the unit cell of the fuel cell according to the embodiment of the present disclosure; and FIG. 5 is a diagram illustrating a frame and a mold of the unit cell of the fuel cell according to the embodiment of the present disclosure.

Referring to FIGS. 3A, 3B, 4 and 5, the unit cell of the fuel cell according to the embodiment of the present disclosure includes: an insert 100 including a membrane electrode assembly (MEA) 110 and a gas diffusion layer (GDL) 120; a foamed body 300 provided on an outer side surface of the insert 100; and a frame 200 formed in which a polymer resin "PR" is injected to an outer side surface "o" of the foamed body 300 and configured to cover the outer side surface of the foamed body 300 while the polymer resin "PR" partly penetrates into the foamed body 300.

In detail, FIG. 3A only shows the insert 100 and the foamed body 300, and FIG. 3B shows the frame 200 formed at the outer side surface of the foamed body 300.

The insert 100 is configured to be a reaction cell, and includes the MEA 110 configured in which an electrolyte membrane, a cathode, and an anode are assembled and the GDL 120 through which hydrogen gas and air are diffused, the GDL 120 being provided at each of opposite sides of the MEA 110. The GDLs 120 are disposed at upper and lower surfaces of the MEA 110 respectively. The MEA 110 and the GDL 120 are made of a porous material in order to pass gases such as hydrogen gas and oxygen therethrough.

The frame 200 is formed in which a polymer is injected to the outside of the insert 100 including the MEA 110 and the GDL 120. The polymer resin "PR" may penetrate into the MEA 110 and the GDL 120, which are porous materials. It is necessary that the polymer resin "PR" partly penetrates into the MEA 110 and the GDL 120 to assemble the MEA 110 and the GDLs 120 in one body. However, according to the related art, it is difficult to control an injection pressure, and as the polymer resin "PR" irregularly penetrates into the MEA 110 and the GDL 120 such that the MEA 110 and the GDL 120 are damaged.

In order to overcome this problem, the present disclosure further includes the foamed body 300 which is provided at the outer side surface "o" of the insert 100 such that the polymer resin "PR" forming the frame 200 penetrates into the foamed body 300 while evenly distributing the polymer resin, the injection pressure is lowered, and the insert 100 and the frame 200 are assembled firmly. Accordingly, the minimum amount of the polymer resin "PR" flows into the inside the insert 100, thereby suppressing damages of the MEA 110 and the GDL 120.

Here, the polymer resin "PR" forming the frame 200 may refer to a resin material having a very large molecular weight (e.g, a molecular weight of 10,000 or more). The polymer resin "PR" according to an embodiment of the present invention may be polyamide or liquid crystal.

In addition, the polymer resin "PR" forming the frame 200 is PPS (Poly Phenylene Sulfide), PPA (Polyphthalamide), PEN (Polyethylene Naphthalate), PES (Polyethersulfone), LCP (Liquid Crystal Polymer), PVDF (Polyvinylidene Fluoride), silicone rubber, fluororubber, or EPDM (Ethylene Propylene diene monomer) rubber as disclosed in the U.S. Pat. No. 9,331,346, and general-purpose plastic, for example engineering plastic or super engineering plastic (e.g, PI, PPS) as disclosed in the U.S. Pat. No. 8,524,416. The polymer resin "PR" forming the frame 200 is not limited to the above-described materials.

Conditions for injection molding of the polymer resin forming the frame 200 may be appropriately set according to the material of the polymer resin. In particular, injection molding conditions include injection speed, mold temperature, injection time, injection pressure, and the like, and can be adjusted to ensure proper moldability of the polymer resin.

Specifically, if the mold temperature is low and the injection time and injection pressure are high, the polymer resin may not be molded or penetrated properly. Conversely, if the mold temperature is high and the injection time and injection pressure are low, deformation, such as bending, of the membrane-electrode assembly 110 or foamed body 300 may occur and a problem of overflowing the polymer resin may occur. Therefore, injection molding conditions must be adjusted to secure appropriate molding quality according to the type of polymer resin.

As an example, the following table is an experiment result according to the process of controlling injection molding conditions using two kinds of liquid crystal polymers as a polymer resin.

| Material (Grade) | Injection speed [mm/s] | Mold temperature [° C.] | Injection time [sec] | Injection pressure [MPa] | Molding quality |
| --- | --- | --- | --- | --- | --- |
| LCP (A) | 50 | 170 | 0.367 | 184.3 | Unmolded/Lack of penetration |
|  |  | 180 | 0.157 | 174.0 | Good |
|  |  | 190 | 0.129 | 161.8 |  |
|  |  | 200 | 0.121 | 156.5 |  |
|  |  | 210 | 0.120 | 145.2 |  |
|  |  | 220 | 0.119 | 135.8 |  |
|  |  | 230 | 0.099 | 120.5 | Overflow/Deformation |
| LCP (B) | 50 | 140 | 0.101 | 163.8 | Unmolded/Lack of penetration |
|  |  | 150 | 0.096 | 150.8 | Good |
|  |  | 160 | 0.094 | 136.0 |  |
|  |  | 170 | 0.092 | 127.4 |  |
|  |  | 180 | 0.088 | 117.1 |  |
|  |  | 190 | 0.086 | 111.4 |  |
|  |  | 200 | 0.085 | 106.8 | Overflow/Deformation |

The foamed body 300 is made of a porous material, and the foamed body 300 may be made of a porous material having high porosity. Particularly, a porous material may be a material having a fine mesh structure and uniform porosity.

In particular, the foamed body 300 is preferably made of a material having a melting point higher than the melting point of the membrane-electrode assembly 110.

For example, the foamed body 300 may be made of non-conductive plastic, rubber, ceramic, etc. Specifically, the foamed body 300 may be made of a plastic blowing agent such as polystyrene foam, polyurethane foam, and polyvinyl chloride foam, which is foamed and cured by adding a blowing agent to a resin which is a raw material, or a plastic foaming agent such as PET (Polyethylene terephthalate), PC (Polycarbonate), Nylon66 or LCP (Liquid Crystal Polymer) material.

The foamed body 300 may be configured on the outer side surface "o" of the insert 100 in an extruding or injecting molding manner. That is, when the foamed body 300 is a polymer material or a ceramic material, the foamed body 300 is configured on the outer side surface "o" of the insert 100 in an extruding or injecting molding manner, and then the frame 200 is configured on the outer side surface of the foamed body 300 in an extruding or injecting molding manner.

The foamed body 300 may be made of a material having large particles such that the amount of the foamed body 300 which penetrates into the insert 100 is minimized during an extruding process or an injecting process with the foamed body 300. The polymer resin "PR" forming the frame 200 may penetrate into a part of or all of the foamed body 300 such that the frame 200 and the foamed body 300 are assembled in one body. In addition, the polymer resin "PR" may partly penetrate into the MEA 110 and the GDL 120 such that the binding therebetween is reinforced.

In another embodiment, the foamed body 300 may be manufactured by injection molding or compression molding separately from the insert 100. Separately manufactured foamed body 300 may be inserted into the insert 100 or, conversely, the insert 100 may be inserted into the foamed body 300 to be coupled. In particular, the foamed body 300 manufactured by injection molding or compression molding may be manufactured in a separate state and coupled to each corner of the insert 100.

Alternatively, the foamed body 300 may be integrally manufactured by knitting. Separately manufactured foamed body 300 may be inserted into the insert 100 or, conversely, the insert 100 may be inserted into the foamed body 300 to be coupled. The foamed body 300 produced by knitting may have a shape surrounding the insert 100 to be positioned therein.

The foamed body 300 may have a porosity greater than the MEA 110 and the GDL 120. The MEA 110 and the GDL 120 are also made of the porous material, while the foamed body 300 may have a porosity greater than the MEA 110 and the GDL 120. Accordingly, it is possible to minimize the amount of the polymer resin "PR" penetrating into the MEA 110 and the GDL 120, the polymer resin "PR" penetrating into the foamed body 300 previously.

In addition, the foamed body 300 may be made of an electrically insulating material. Because the foamed body 300 is provided on an outer side surface of the MEA 110, the foamed body 300 may be in contact with an electrode of the MEA 110. When both electrodes of the MEA 110 are contact with each other, a short-circuit and the like occurs, whereby the foamed body 300 is made of an electrically insulating material to prevent such a problem.

The frame 200 may be configured to partly cover upper and lower surfaces of the insert 100 to reinforce the binding between the frame 200 and the insert 100. In particular, the frame 200 may cover peripheral portions of the upper and lower surfaces of the insert 100 and an outer side surface "o" of the insert 100.

Accordingly, an inner side surface of the frame 200 is configured to be greater than the outer side surface "o" of the insert 100 in thickness such that the inner side surface of the frame 200 is configured to partly cover the upper and lower surfaces of the insert 100.

In particular, in order to cover an entire area where the frame 200 is formed by injection molding, the foamed body 300 is configured in which a top end "T" of the inner side surface "I" of the foamed body 300 is higher than a top end "t" of the outer side surface "o" of the insert 100 and a bottom end "L" of the inner side surface "I" of the foamed body 300 is lower than a bottom end "l" of the outer side surface "o" of the insert 100 such that the foamed body 300 has a thickness greater than the insert 100. The heights of the foamed body 300 and the frame 200 are configured to be same such that foamed body 300 covers the entire area where the frame 200 is formed by injection molding.

In addition, the inner side surface "I" of the foamed body 300 may also be configured to partly cover the upper and lower surfaces of the insert 100. Accordingly, the foamed body 300 covers the upper and lower surfaces of the insert 100 covered the frame 200, such that it is possible to prevent the polymer resin "PR" forming the frame 200 from penetrating the upper or lower surface of the insert 100.

A part of or all of the foamed body 300 is melted with the polymer resin "PR" forming the frame 200 such that the foamed body 300 and the frame 200 are assembled in one body. That is, a melting point of the foamed body 300 may be lower than a temperature at which the polymer resin "PR" forming the frame 200 is injected. Thus, when the polymer resin "PR" forming the frame 200 is injected, the foamed body 300 may be partly or wholly melted due to contact with the polymer resin "PR" such that the melted foamed body 300 is mixed with the polymer resin "PR" forming the frame 200 whereby the foamed body 300 and the frame 200 are assembled in one body.

After the foamed body 300 serves to lower the injection pressure of the polymer resin "PR" forming the frame 200 and distribute the polymer resin "PR" uniformly, the foamed body 300 and the frame 200 are assembled in one body whereby the binding therebewteen is reinforced.

The polymer resin "PR" may partly or wholly penetrate into the foamed body 300 such that the frame 200 is assembled with the foamed body 300 in one body. The polymer resin "PR" may surround the outer side surface of the foamed body 300.

Figure 6:
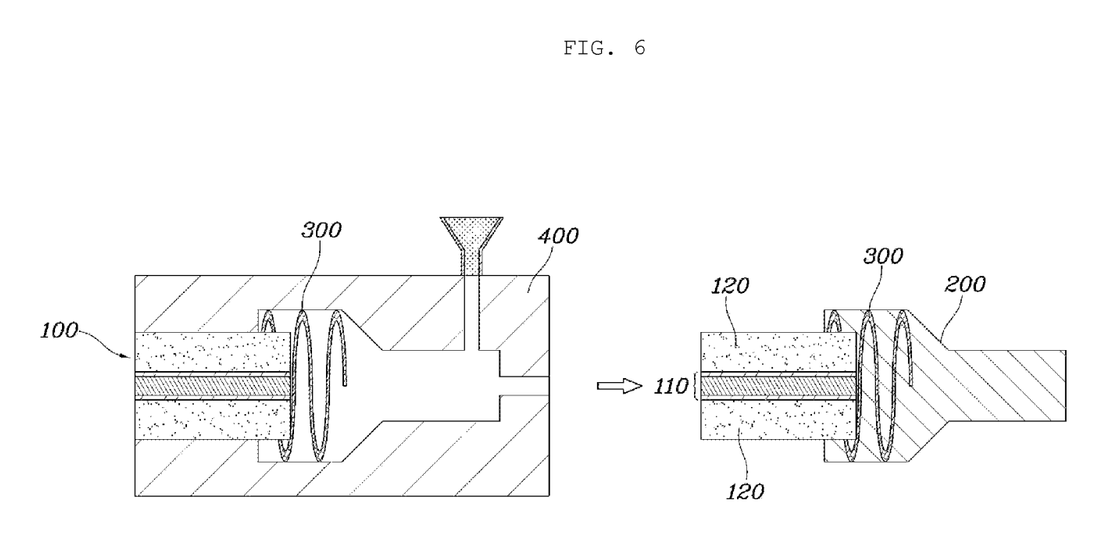
FIGS. 6 to 8 depict cross-sectional views each illustrating a unit cell of a fuel cell and a frame mold according to various embodiments of the present disclosure.
Figure 7:
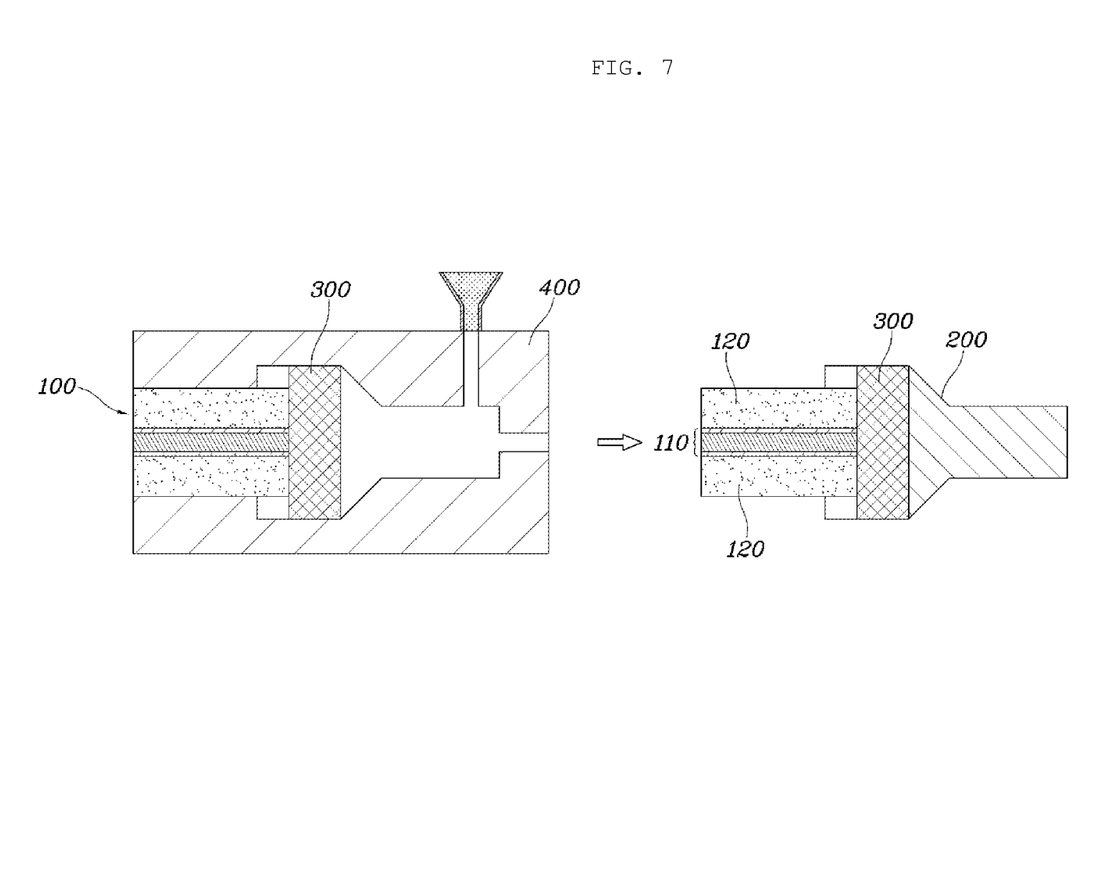
Figure 8:
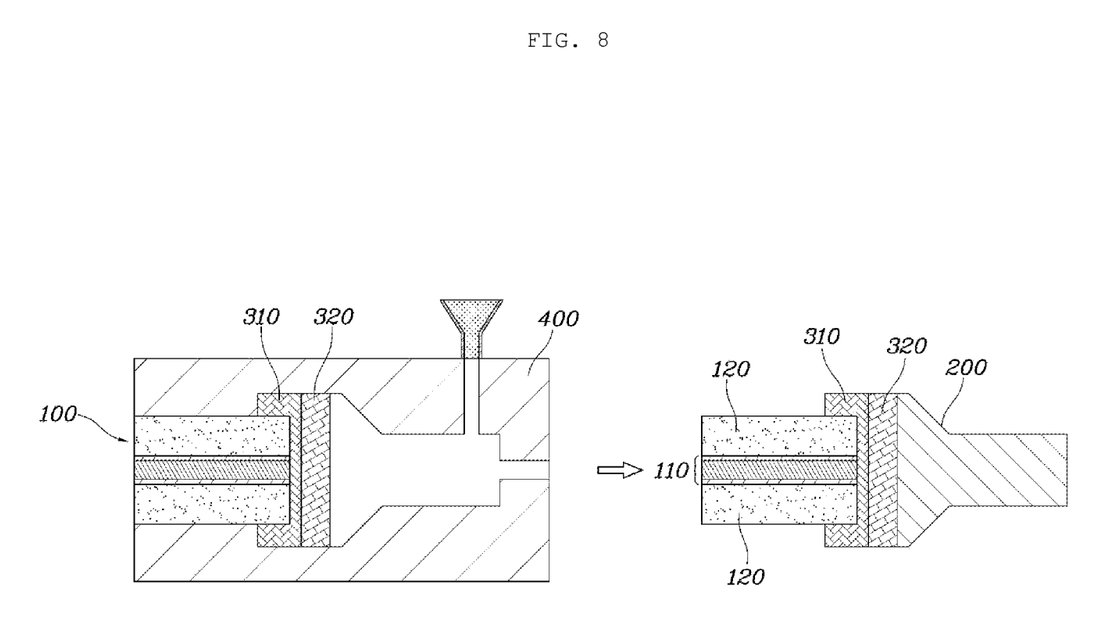

FIGS. 6 to 8 depict cross-sectional views each illustrating a unit cell of a fuel cell and molds 400 for the frame 200 according to various embodiments of the present disclosure.

Referring to FIG. 6, in addition to an extruding or injecting molding manner, the foamed body 300 may be further configured to partly surround the insert 100. In detail, the foamed body 300 may be configured to partly surround the upper and lower surfaces of the insert 100 and a side surface between the upper and lower surfaces of the insert 100 in order. That is, the separately formed foamed body 300 may be positioned extending outwardly of the insert 100 while partly surrounding the insert 100.

In particular, the foamed body 300 is configured in which a synthetic fiber "SF" partly surrounds the outer portion of the insert 100. The foamed body 300 may be formed in a structure in which thin and long synthetic fibers are intertwined to partly cover the outer portion of the insert 100, and may further extend to the outside of the insert 100. The synthetic fiber "SF" may be a porous material. Alternatively, the synthetic fiber "SF" may be not a porous material but have an entangled structure to form the foamed body 300 due to interspaces between the synthetic fibers "SF".

Referring to FIG. 7, the foamed body 300 may be configured to be greater than the insert 100 in thickness. As described above, the frame 200 may be configured to be greater than the insert 100 in thickness in order to partly cover the upper and lower surfaces of the insert 100. The foamed body 300 may be configured to be greater than the insert 100 in thickness to have the same thickness as the frame 200.

In addition, the insert 100 may be positioned inside the mold 400 including an upper mold and a lower mold, and thus, it is possible to directly position the insert 100 by the upper mold and the lower mold. However, the insert 100 in contact may be damaged as the temperature of the mold 400 rises due to the injection molding in which the high temperature polymer resin "PR" is injected. Thus, the thickness of the foamed body 300 is configured to be greater than the thickness of the insert 100 to position the insert 100 inside the mold 400 whereby it is possible to prevent the insert 100 from being damaged by high temperature.

Referring to FIG. 8, the foamed body 300 may include a first layer 310 directly coming into contact with the outer side surface of the insert 100 and a second layer 320 coupled to cover an outer side surface "o" of the first layer 310. A porosity of the first layer 310 may be smaller than a porosity of the second layer 320.

That is, the foamed body 300 may be configured with the first layer 310 and the second layer 320 which are formed with materials having different porosities. An inner side surface of the first layer 310 may be configured to cover the outer side surface "o" of the insert 100 in a direct contact manner, and an inner side surface of the second layer 320 may be configured to cover the outer side surface of the first layer 310.

The first layer 310 may be configured to have relatively smaller porosity in order to reduce the polymer resin "PR", which is an injection material penetrating to the inside of the insert 100, in a manner that the first layer 310 directly comes into contact with the outer side surface "o" of the insert 100 to be positioned adjacent to the insert 100.

On the other hand, the second layer 320 is a region to which the injection material directly flows, and may be configured to position to be relatively spaced apart from the insert 100 and to have relatively larger porosity such that the polymer resin "PR" easily penetrates the inside of the insert 100.

In addition, the second layer 320 may have a lower melting point compared to the first layer 310 such that the second layer 320 is melted by the introduction of the polymer resin "PR" and mixed with the polymer resin "PR", thereby being assembled with the frame 200 in one body.

Since the foamed body 300 is configured as the first layer 310 and the second layer 320 which are positioned relatively adjacent and relatively apart to the insert 100 and have different porosities, the foamed body 300 is configured to have an optimum porosity according to the positional characteristics.

A method of manufacturing a unit cell of a fuel cell according to an embodiment of the present disclosure includes: forming a foamed body 300 on an outer side surface of an insert 100 including a MEA 110 and a GDL 120; and forming a frame 200 in which a polymer resin "PR" is injected to an outer side surface of the foamed body 300 such that the polymer resin "PR" partly penetrates into the foamed body 300.

At the forming of the foamed body 300, the foamed body 300 is formed on the outer side surface "o" of the insert 100 in an extruding or injecting molding manner.

In another embodiment, at the forming of the foamed body 300, the foamed body 300 may be configured to couple with the outside of the insert 100. In particular, the foamed body 300 may be configured in which a synthetic fiber "SF" partly surrounds the outer portion of the insert 100. That is, the synthetic fiber "SF", which is fabricated separately, surrounds the outer portion of the insert 100 partly for binding such that the foamed body 300 is formed. The synthetic fiber may extend outwardly of the insert 100 while partly surrounding the outer portion of the insert 100.

At the forming of the frame 200, as the polymer resin "PR" penetrates into the foamed body 300, the frame 200 is assembled with the foamed body 300 in one body such that an inner side surface of the frame 200 partly covers upper and lower surfaces of the insert 100.

That is, as the polymer resin "PR" penetrates into the foamed body 300, the frame 200 is assembled with the foamed body 300 in one body such that an inner side surface of the frame 200 partly covers the upper and lower surfaces of the insert 100 as well as the outer side surface "o" of the insert 100.

Although the specific embodiments of the present disclosure have been described with reference to the accompanying drawings, those skilled in the art will appreciate that various modifications, additions and substitutions are possible, without departing from the scope and spirit of the invention.

What is claimed is:

1. A unit cell of a fuel cell, the unit cell comprising:
an insert including a membrane electrode assembly (MEA) and a gas diffusion layer (GDL);
a foamed body disposed on an outer side surface of the insert and having porosity; and
a frame covering an outer side surface of the foamed body such that a polymer resin is injected to the outer side surface of the foamed body while the polymer resin partly penetrates into the porosity of the foamed body,
wherein a part of or all of the foamed body includes the polymer resin for the frame such that the foamed body and the frame are assembled as one body.

2. The unit cell of claim 1, wherein a top end of an inner side surface of the foamed body is located to be higher than a top end of the outer side surface of the insert and a bottom end of the inner side surface of the foamed body is located to be lower than a bottom end of the outer side surface of the insert such that the foamed body has a thickness greater than that of the insert.

3. The unit cell of claim 2, wherein the inner side surface of the foamed body partly covers upper and lower surfaces of the insert.

4. The unit cell of claim 1, wherein the foamed body includes an electrically insulating material.

5. The unit cell of claim 1, wherein the foamed body has a porosity greater than those of the MEA and the GDL.

6. The unit cell of claim 1, wherein the foamed body surrounds an outer portion of the insert.

7. The unit cell of claim 1, wherein the foamed body includes:
a first layer directly coming into contact with the outer side surface of the insert; and
a second layer coupled to and covering an outer side surface of the first layer,
wherein a porosity of the first layer is smaller than a porosity of the second layer.

8. The unit cell of claim 1, wherein an inner side surface of the frame partly covers upper and lower surfaces of the insert.

* * * * *